(12) United States Patent
Palenius et al.

(10) Patent No.: US 9,307,460 B2
(45) Date of Patent: Apr. 5, 2016

(54) NEIGHBORING CELL MEASUREMENTS

(71) Applicant: ST-Ericsson SA, Plan-les-Ouates (CH)

(72) Inventors: Torgny Palenius, Lund (SE); Jagadeesh Arunachalam, Malmö (SE); Tobias Junno, Lund (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/381,744

(22) PCT Filed: Mar. 14, 2013

(86) PCT No.: PCT/EP2013/055308
§ 371 (c)(1),
(2) Date: Aug. 28, 2014

(87) PCT Pub. No.: WO2013/143870
PCT Pub. Date: Oct. 3, 2013

(65) Prior Publication Data
US 2015/0024753 A1    Jan. 22, 2015

Related U.S. Application Data

(60) Provisional application No. 61/620,003, filed on Apr. 4, 2012.

(30) Foreign Application Priority Data

Mar. 30, 2012 (EP) .................... 12162496

(51) Int. Cl.
*H04W 36/00* (2009.01)
*H04W 36/30* (2009.01)
*H04W 36/18* (2009.01)

(52) U.S. Cl.
CPC ...... *H04W 36/0061* (2013.01); *H04W 36/0083* (2013.01); *H04W 36/30* (2013.01); *H04W 36/18* (2013.01)

(58) Field of Classification Search
None
See application file for complete search history.

(56) References Cited

U.S. PATENT DOCUMENTS

2004/0023634 A1    2/2004    Jeong et al.
2005/0266845 A1    12/2005   Aerrabotu et al.
(Continued)

FOREIGN PATENT DOCUMENTS

WO    98/59448 A2    12/1998
WO    2009/038368 A1    3/2009

OTHER PUBLICATIONS

3GPP (3rd Generation Partnership Project; Technical Specification 25.331 V5.2.0, Sep. 2009; pp. 1 and 927-943).*
(Continued)

Primary Examiner — Leon-Viet Nguyen
(74) Attorney, Agent, or Firm — Patent Portfolio Builders PLLC

(57) ABSTRACT

An arrangement (400) for a user equipment, UE, is disclosed. The arrangement (400) comprises an acquiring unit (401) configured to acquire neighboring cell information relating to a plurality of neighboring cells. An assignment unit (403) is provided to assign a priority indicator to each neighboring cell based on the neighboring cell information. Also, a measurement unit (404) is provided to perform measurements on the basis of the assigned priority indicators. The arrangement (400) is arranged such that measurements can be performed more frequently for a neighboring cell having a first priority indicator compared with another neighboring cell having a second priority indicator, which second priority indicator is comparatively lower than the first priority indicator. The disclosure also presents corresponding methods, computer program products and devices.

11 Claims, 4 Drawing Sheets

(56) References Cited

U.S. PATENT DOCUMENTS

| | | | |
|---|---|---|---|
| 2008/0207201 A1* | 8/2008 | Fischer | H04W 48/12 455/434 |
| 2009/0047958 A1* | 2/2009 | Rimhagen | H04J 11/0093 455/436 |
| 2011/0105123 A1* | 5/2011 | Lee et al. | 455/436 |
| 2011/0183662 A1* | 7/2011 | Lee et al. | 455/422.1 |
| 2011/0201338 A1 | 8/2011 | Zou | |

OTHER PUBLICATIONS

3rd Generation Partnership Project; Technical Specification 25.133 V11.0.0 entitled, "Requirements for support of radio resource management (FDD)"; Technical Specification Group Radio Access Network; Release 11; Mar. 2012; pp. 1-270.

3rd Generation Partnership Project; Technical Specification 25.304 V10.3.0 entitled, "User Equipment (UE) procedures in idle mode and procedures for cell reselection in connected mode"; Technical Specification Group Radio Access Network; Release 10; Dec. 2011; pp. 1-52.

3rd Generation Partnership Project; Technical Specification 25.331 V10.5.0 entitled, "Radio Resource Control (RRC)"; Technical Specification Group Radio Access Network; Protocol specification Release 10; Sep. 2011; pp. 1-1882.

International Search Report issued in corresponding International application No. PCT/EP2013/055308, date of mailing May 24, 2013.

Written Opinion of the International Searching Authority issued in International application No. PCT/EP2013/055308, date of mailing May 24, 2013.

Extended European Search Report issued in corresponding European application No. EP 12 16 2496, dated Jul. 13, 2012.

* cited by examiner

NEIGHBORING CELL MEASUREMENTS

TECHNICAL FIELD

Embodiments of the present invention generally relate to the field of performing measurements in cellular mobile communication systems. More particularly, embodiments of the present invention relate to methods, arrangements and user equipments for performing cell measurements on the basis of assigned priority indicators.

BACKGROUND

In a cellular mobile communications system having a plurality of cells controlled by a plurality of base stations (e.g., a BTS (Base Transceiver Station), Node B or eNodeB), a user equipment (UE) generally communicates data or control signals with base stations, detects a cell that is suitable for the UE to receive normal and/or emergency services (hereinafter, such a cell will be referred to as "source cell"), and thereby can camp on that cell. "Camping on a cell" means that a UE in an idle mode connects to a cell found through cell selection/cell re-selection.

As used herein, "cell re-selection" is used when a user equipment, UE, is in e.g. an idle mode (IDLE, CELL/URA_PCH, EACH) and then the UE decides to re-select cell or not. In contrast, when referring to handover, it is referred to when the UE is in connected or dedicated mode (CELL_CH). When in connected mode, measurement reports are sent to the network side, and the network side then decides to handover to another cell or not.

To merely present the background to the reader, in the Universal Mobile Telecommunications System (UMTS) system, a UE that has camped on a cell receives the identification of the cell, the identification of a tracking area, and a neighboring cell list through a broadcast channel (BCCH) from the serving base station controlling this cell, and monitors a paging channel (PCH). The UE also monitors pilot channels (CPICH) from neighboring cells periodically. Neighboring cell information included in the neighboring cell list typically includes the carrier frequencies of the neighboring cells and other system parameters.

When the UE has detected a better cell (generally, a cell exhibiting better radio quality) than the serving cell on which the UE is currently camping, then the UE can camp on this newly detected cell as its new serving cell. This cell re-selection may be performed by a UE, based on some criterion provided from the network side. For example, when the UE experiences deterioration in the radio quality of its serving cell, and if this state of deterioration continues for a certain period of time then the UE can perform in cell re-selection by using the neighboring cell information in the neighboring cell list. Such cell re-selection may be performed through the following procedure: While sequentially setting a carrier frequency according to the neighboring cell information stored in the neighboring cell list, the UE checks whether or not a neighboring cell having better radio quality than that of the current serving cell is detected. When such a cell having better radio quality is found (thus, detected), the UE selects and camps on this cell having better radio quality as its new serving cell. As described above, since it is sufficient for the UE to check and detect the radio qualities only of the neighboring cells stored in the neighboring cell list, it is possible to select a cell having better radio quality at a relatively high speed. Additionally, the neighboring cell list is also utilized to measure the radio qualities of the neighboring cells at the time of handover.

If the UE cannot detect a suitable cell among the cells of the neighboring cell list provided from the network side, the UE typically starts carrier sequential search, by which all possible carrier frequencies can be sequentially searched, to find a suitable cell to camp on. The detection of a suitable cell by means of this carrier sequential search is called "cell selection" in the UMTS system. The cell selection may include initial cell selection and stored-information cell selection. In the initial cell selection, the UE can sequentially search all existing frequency bands, thereby detecting a suitable cell. In the stored-information cell selection, the UE, having stored information about carrier frequencies in advance, carries out carrier sequential search of the frequency bands limited by this stored-in-advance information, thereby detecting a suitable cell. The stored-information cell selection typically enables higher-speed detection of a suitable cell because carrier sequential search is carried out in limited frequency bands.

In the cell selection, in any case, the UE carries out sequential search of carrier frequencies. Therefore, the cell selection generally requires a longer time than the cell re-selection, and services may become interrupted during this period of time.

Procedures for the cell selection and for the cell re-selection in the UMTS system are described in the following 3GPP (The 3rd Generation Partnership Project) technical specifications:

3GPP TS 25.133 "Requirements for support of radio resource management (FDD)" (Version 11.0.0, publicly available in January 2012);

3GPP TS 25.304 "User Equipment (UE) procedures in idle mode and procedures for cell re-selection in connected mode" (Version 10.3.0, publicly available in December 2011); and 3GPP TS 25.331 "Radio Resource Control (RRC); Protocol Specification" (Version 11.0.0, publicly available in January 2012).

When performing a handover (in connected/dedicated mode) or cell re-selection (in idle mode), a conventional approach is to try to find all cells comprised in a neighboring cell list and measure on all the detected cells with equal priority. i.e. the frequency and accuracy of the measurements for all the cells is the same. When the number of cells is large, the UE may not get enough time to detect and measure on all cells and the handover decision may thus be made based on old measurement values. This means that the UE may not be handed over (in connected/dedicated mode), or re-select (in a non-connected/non-dedicated (e.g. idle mode), to the correct cells quickly enough, thereby increasing the risk of dropping a call.

SUMMARY

It is in view of the above considerations and others that the various embodiments of the present invention have been made. The inventors have realized that there is a need for improved handovers and/or cell re-selections.

In view of the above, it is therefore a general object of the various embodiments of the present invention to provide for improved measurements, which in turn may allow for improved handovers and/or cell re-selections.

The various embodiments of the present invention as set forth in the appended claims address this general object.

According to a first aspect, there is provided a method performed by a user equipment, UE. The method comprises acquiring neighboring cell information relating to a plurality of neighboring cells, assigning a priority indicator to each neighboring cell based on the neighboring cell information, and performing measurements on the basis of the assigned priority indicators such that measurements are performed more frequently for a neighboring cell having a first priority indicator compared with another neighboring cell having a second priority indicator, which second priority indicator is comparatively lower than the first priority indicator. In other words, some cells are prioritized more compared to other cells. Or said differently, some cells are prioritized over other, less prioritized, cells.

An advantage is that cells that have high priority indicators (i.e., cells that are prioritized more) will be measured more frequently. Thus, it is believed that suitable cells will be found (i.e., detected) more quickly, hence, reducing the risk of dropping a call during the handover (or, cell re-selection). Moreover, for cells having high priority indicators (i.e., cells that are prioritized over other cells) the measurements can be made up to date since the measurements are made more frequently.

In one embodiment, the step of performing measurements on the basis of the assigned priority indicators comprises performing the measurements in an order indicated by the assigned priority indicators. Hence, cells having high assigned priority indicator may be measured first and cells having comparatively lower assigned priority indicators may be measured later. This may allow for a further expedited detection of suitable candidate cells, thus, reducing the risk for dropping a call.

In some embodiments, the neighboring cell information comprises a neighboring cell list wherein each cell of the neighboring cell list is associated with an index and wherein the step of assigning the priority indicator comprises assigning the priority indicator on the basis of the indices of the neighboring cells. In one embodiment, the step of assigning the priority indicator comprises assigning a comparatively higher priority indicator to a neighboring cell having a first index compared with another neighboring cell having a second index, which second index is comparatively higher than the first index.

In some embodiments, the neighboring cell information comprises information on measurement reports for a respective cell in the neighboring cell list and the step of assigning the priority indicator comprises assigning the priority indicator on the basis of the information on the measurement reports. The information on measurement reports, may for example comprise information on what type of measurements should be performed. It should be noted that in such embodiments, the neighboring cell information may have a wider meaning than "neighbor cell information" of 3GPP standard specifications, for example embracing both "neighbor cell information" and measurement type as typically included in a measurement configuration message of 3GPP standard specifications. In one embodiment, the step of assigning the priority indicator comprises assigning a comparatively higher priority indicator to a neighboring cell that is configured for measurement reports that are relevant for handover compared with another neighboring cell that is configured for other events. For example, the measurement reports that are relevant for handover may comprise event reports 1A, 1B and/or 1C.

In some embodiments, the neighboring cell information comprises a neighboring cell list and the step of assigning the priority indicator comprises assigning a comparatively higher priority indicator to a neighboring cell having a first carrier frequency compared with another neighboring cell having a second carrier frequency, wherein a number of cells having the first carrier frequency comprised in the neighboring cell list is higher than a number of cells having the second carrier frequency comprised in the neighboring cell list.

According to a second aspect, there is provided a computer program product comprising a computer readable medium, having thereon a computer program comprising program instructions, the computer program being loadable into a data-processing unit for a user equipment, and the computer program being adapted to cause execution of the method according to the first aspect when the computer program is run by the data-processing unit.

According to a third aspect, there is provided an arrangement for a user equipment, UE. The arrangement comprises: an acquiring unit configured to acquire neighboring cell information relating to a plurality of neighboring cells; an assignment unit configured to assign a priority indicator to each neighboring cell based on the neighboring cell information; and a measurement unit configured to perform measurements on the basis of the assigned priority indicators such that measurements can be performed more frequently for a neighboring cell having a first priority indicator compared with another neighboring cell having a second priority indicator, which second priority indicator is comparatively lower than the first priority indicator. In other words, some cells are prioritized more compared to other cells. Or said differently, some cells are prioritized over other, less prioritized, cells.

An advantage is that cells that have high priority indicators (i.e., cells that are prioritized more) will be measured more frequently. Thus, it is believed that suitable cells will be found (i.e., detected) more quickly, hence, reducing the risk of dropping a call during the handover (or, cell re-selection). Moreover, for cells having high priority indicators (i.e., cells that are prioritized over other cells) the measurements can be made up to date since the measurements are made more frequently.

In an embodiment, the measurement unit is configured to perform measurements in an order indicated by the assigned priority indicators. Hence, cells having high assigned priority indicator may be measured first and cells having comparatively lower assigned priority indicators may be measured later. This may allow for a further expedited detection of suitable candidate cells, thus, reducing the risk for dropping a call.

In some embodiments, the neighboring cell information comprises a neighboring cell list, wherein each cell of the neighboring cell list is associated with an index and wherein the assignment unit is configured to assign the priority on the basis of the indices of the neighboring cells. The assignment unit may, e.g., be configured to assign a comparatively higher priority indicator to a neighboring cell having a first index compared with another neighboring cell having a second index, which second index is comparatively higher than the first index.

In some embodiments, the neighboring cell information comprises information on measurement reports for a respective cell in the neighboring cell list and the assignment unit is configured to assign the priority indicator on the basis of the information on the measurements reports.

The assignment unit may, e.g., be configured to assign a comparatively higher priority indicator to a neighboring cell that is configured for measurement reports that are relevant for handover compared with another neighboring cell that is configured for other events. For example, the measurement reports that are relevant for handover may comprise event reports 1A, 1B and/or 1C.

According to a fourth aspect, there is provided an electronic device comprising the arrangement according to third aspect. The electronic device may, e.g., be one of: a user equipment (such as a mobile phone), an electronic chip, a modem, and a telecommunication platform.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like numbers refer to like elements throughout the description.

In the following, the present disclosure will outline various embodiments allowing for improved handovers or cell re-selections. In a typical scenario, a UE acquires neighboring cell information relating to a plurality of neighboring cells, assigns a priority indicator to each neighboring cell based on the neighboring cell information, and performs measurements on the basis of the assigned priority indicators such that measurements are performed more frequently for a neighboring cell having a first priority indicator compared with another neighboring cell having a second priority indicator, which second priority indicator is comparatively lower than the first priority indicator.

The measurements that can be performed include, but are not limited to, infra-frequency measurements, inter-frequency measurements, inter-RAT (Radio Access Technology) measurements, etc.

An advantage with the various embodiments of the present invention is that cells that have a higher prioritization will be measured more frequently. The priority indicators can be assigned based on a prediction regarding which cells are most likely good candidates for handover, or cell re-selection. Consequently, it is believed that suitable cells will be found (i.e., detected) more quickly, hence, reducing the risk of dropping a call during the handover (cell re-selection). Measurements used in e.g. handover decisions will also be more up to date, thus reflecting more accurately the current status of the radio surroundings. In some embodiments, the measurements can be in an order indicated by the assigned priority indicators. For example, cells having high assigned priority indicator can be measured first. Then, cells having comparatively lower assigned priority indicators can be measured later. This may allow for a further expedited detection of suitable cells, thus, reducing the risk for dropping a call.

Embodiment 1

Intra-Frequency Measurements

Figure 1:
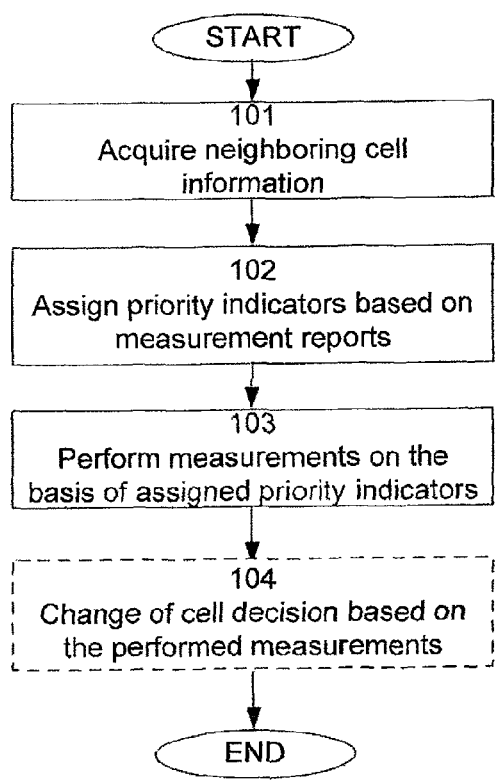
FIG. 1 is a flow chart illustrating example method steps according to an embodiment.

FIG. 1 illustrates a flowchart illustrating example method steps of an embodiment of the present invention. The method starts in step 101, where the UE acquires neighboring cell information relating to a plurality of neighboring cells (i.e. cells that are neighbor cells to the serving cell currently serving the UE). The neighboring cell information can, e.g., be provided to the UE from the network side (i.e., a node from the network side). Thus, the UE has knowledge of neighbor cells of the current serving cell. For example, the neighboring cell information may comprise a neighboring cell list and an additional "cells for measurement"—IE (Information Element). The "cells for measurement"—IE may be an optional IE, which could be provided to the UE from the network side. If the neighboring cell information comprises the optional "cells for measurement"—IE, the cells indicated for a given intra-frequency (and/or inter-frequency, inter-RAT, respectively) measurement by the "cells for measurement"—IE can be considered for measurement.

In a subsequent step, step 102, a priority indicator is assigned to each neighboring cell based on the neighboring cell information. More particularly, the neighboring cell information may comprise information on measurements reports (if any) for the cells in the neighbor cell list. Typically, the network side configures what events should be reported (as well as related parameters such as threshold, hysteresis etc). In some embodiments the "cells for measurement"—IE information may be utilized in this step. Different types of measurements give rise to different types of event reports (sometimes also referred to as report events or reporting events). The technical specification 3GPP TS 25.331 defines various event reports in section 14.1.1 according to the following:

Report event 1A: A Primary CPICH (Common Pilot Indicator CHannel) enters the reporting range Report event 1B: A primary CPICH leaves the reporting range Report event 1C: A non-active primary CPICH becomes better than an active primary CPICH Report event 1D: Change of best cell Report event 1E: A Primary CPICH becomes better than an absolute threshold Report event 1F: A Primary CPICH becomes worse than an absolute threshold Report event 1J: A non-active E-DCH (Enhanced Dedicated CHannel) but active DCH (Dedicated CHannel) primary CPICH becomes better than an active E-DCH primary CPICH Report event 1G: Change of best cell (TDD, Time Division Duplex)

Report event 1H: Timeslot ISCP below a certain threshold (TDD)

Report event 1I: Timeslot ISCP above a certain threshold (TDD)

The inventors have realized that some of these report types give information that is relevant to the handover decision. More particularly, the inventors have realized that cells that are configured for measurements relating to events 1A, 1B and 1C, respectively, are those cells where the UE is likely handed over to. Thus, the inventors have realized to give measurements reports related to information relevant for handover decision higher priority than other events. Hence, in one example embodiment higher priority indicators are assigned to cells that are configured for measurements relating to events 1A, 1B, and/or 1C compared to cells configured for measurements relating to other events (e.g. 1D, 1E, etc.)

In the following step, step 103, measurements are performed on the basis of the assigned priority indicators such that measurements are performed more frequently for a neighboring cell having a higher priority indicator compared with another neighboring cell having a comparatively lower priority indicator than the first priority indicator. Since cells that are configured for measurement reports that are relevant for the handover decision are given high priority (thus, have been assigned high priority indicators), the measurements can be performed such that measurements are performed more frequently for those cells. In an example embodiment, the measurement reports that are relevant for handover comprises event reports 1A, 1B and/or 1C. Additionally, or alternatively, the measurements may be performed in an order indicated by the assigned priority indicators such that, for example, neighboring cells whose reporting is based on events 1A, 1B and/or 1C are measured first.

In a subsequent step, step 104, a change of cell decision may be based on the measurements that were performed in step 103.

Embodiment 2

Intra-Frequency Measurements

Figure 2:
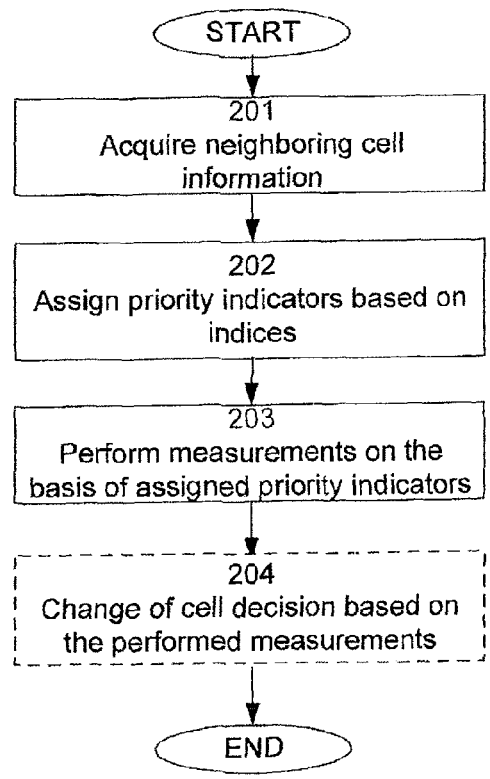
FIG. 2 is a flow chart illustrating example method steps according to another embodiment.
Figure 3:
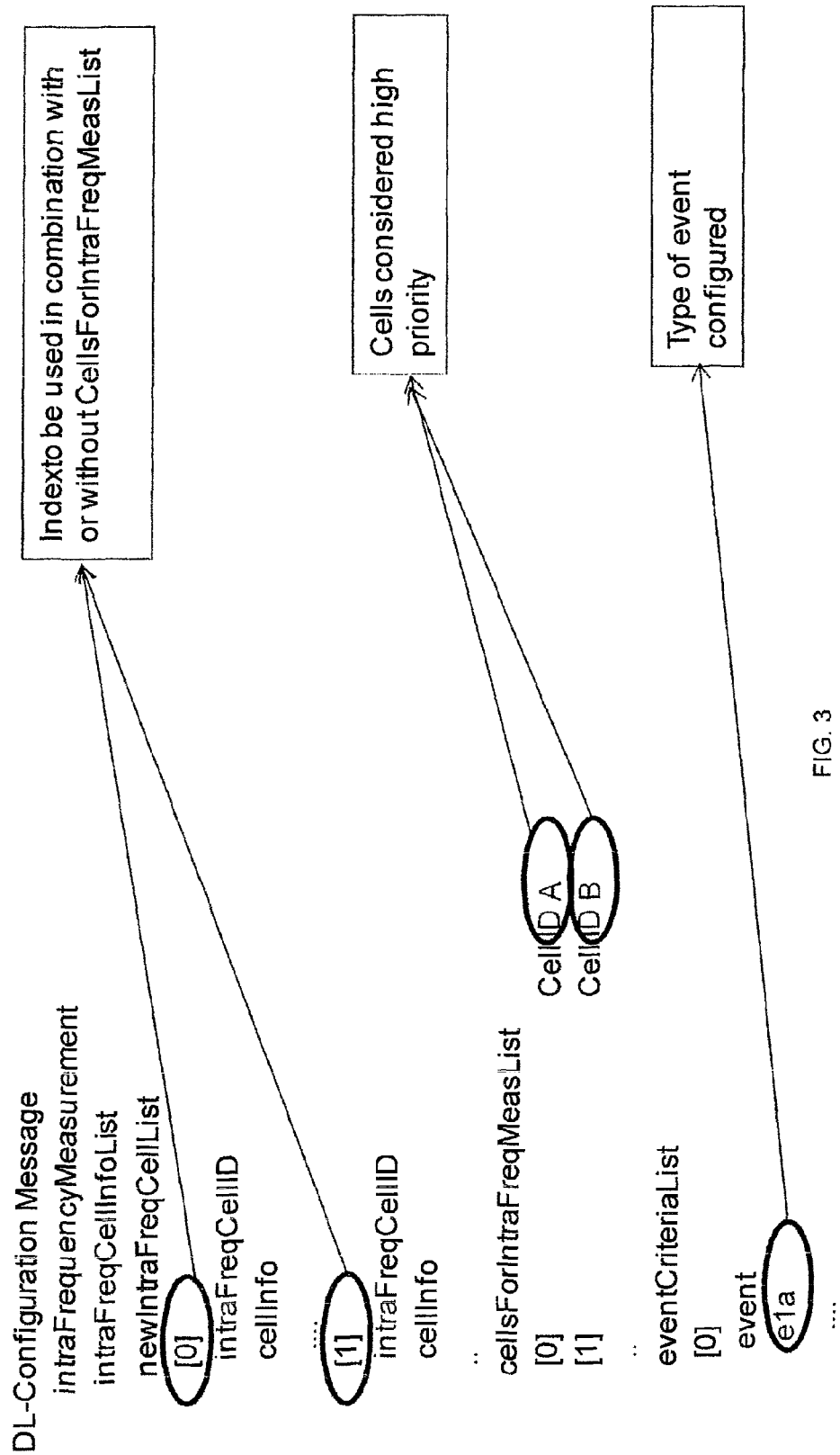
FIG. 3 is an example message received by a UE from the network.

FIG. 2 illustrates a flowchart illustrating example method steps of an embodiment of the present invention. The method starts in step 201, where the UE acquires neighboring cell information relating to a plurality of neighboring cells (i.e. cells that are neighbor cells to the serving cell currently serving the UE). The neighboring cell information can, e.g., comprise a neighboring cell list. This neighboring cell list can be provided to the UE from the network side (i.e., a node from the network side). Thus, the UE has knowledge of neighbor cells of the current serving cell. For example, the neighboring cell list may comprise a list of neighboring cells, wherein each cell of the neighboring cell list is associated with an index. FIG. 3 illustrates an example message received from the network side. As can be seen, there exist different indices illustrated within brackets, i.e. [0], [1], etcetera. Typically, the index relates to the position of the cell in the neighboring cell list (and/or a position in "cells for measurement"—IE), for example a position in an array. The inventors have realized that those cells of the neighboring cell list that have the lowest indices (in the list) could be set (by the network side) to typically represent the closest neighboring cells. As the UE moves, the network side typically changes the indices in such a way that the lowest indices appearing in the neighboring cell list are occupied by those cells that represent the closest neighbor cells. In this regard, it should be appreciated that the closest neighboring cells typically represent those cells that are preferred to handover to.

In a subsequent step, step 202, a priority indicator is assigned to each neighboring cell of the neighboring cell list based on indices. A comparatively higher priority indicator is assigned to a neighboring cell having a first index compared with another neighboring cell having a second index, which second index is comparatively higher than the first index. In other words, cells associated with the lowest indices are prioritized, thus given higher priority indicators, over cells associated with higher indices. This way, the assumedly most preferred (or, best) candidate cells for a handover (cell reselection) are given higher priority indicators compared to less good candidate cells.

In the following step, step 203, measurements are performed on the basis of the assigned priority indicators such that measurements are performed more frequently for a neighboring cell having a higher priority indicator (i.e., low index) compared with another neighboring cell having a comparatively lower priority indicator (i.e. higher index) than the first priority indicator.

Additionally, or alternatively, the measurements may be performed in an order indicated by the assigned priority indicators such that, for example, neighboring cells having a low index are measured first.

In a subsequent step, step 204, a change of cell decision is based on the measurements that were performed in step 203.

It should be appreciated that the hereinabove discussed embodiments, i.e. Embodiment 1 and Embodiment 2, can be combined. That is, the assignment of priority indicators can be made on the basis of a combination of both type of events as in Embodiment 1 and indices as in Embodiment 2 (e.g., indices in "cells for measurements" and/or indices in the neighboring cell list). In such embodiments, the criteria may be to give event reports higher priority than indices. That is to say that the assignment of priority indicators is first based on the event reports and, subsequently, adjusted on the basis of indices (i.e. indices in "cells for measurements" and/or indices in the neighboring cell list). If both indices are used, any index type may be used to first prioritize among those cells having the same priority based on event report types, and the other index type may be used to subsequently prioritize among those cells still having the same priority based on type of events and the first index prioritization. In other embodiments, it may be preferred to give indices prioritization over type of events. That is to say that the assignment of priority indicators are first based on the indices as described with respect to FIG. 2 and, subsequently, adjusted on the basis of type of events as described with respect to FIG. 1.

Embodiment 3

Inter-Frequency and Inter-RAT Measurements

Yet another embodiment relates to inter-frequency and inter-RAT measurements. This embodiment may advantageously be combined with any of or a combination of the herein described embodiments 1 and 2.

Again, the UE acquires neighboring cell information relating to a plurality of neighboring cells (i.e. cells that are neighbor cells to the serving cell currently serving the UE). The neighboring cell information can, e.g., comprise a neighboring cell list and carrier information relating to each cell of the neighboring cell list. This neighboring cell list can be provided to the UE from the network side (i.e., a node from the network side). Thus, the UE has knowledge of neighbor cells of the current serving cell.

The inventors have realized that the carrier with most cells in the neighboring cell list may advantageously be prioritized over other carriers, i.e. carriers with fewer cells. Assume that a certain frequency F1 has N number of cells in the neighboring cell list and frequency F2 has M number of cells in the neighboring cell list. If M is larger than a pre-defined threshold (equal to or larger than N), then it is proposed that F2 is given a higher priority according to an embodiment. If M is equal to N, then both frequencies may be assigned an equal priority. In the latter case, the frequency corresponding to the neighboring cell having the lowest index in the neighboring cell list can be measured first. In other words, the following criteria may be applied (in this or any other order):

The carriers with a cell with lowest index in the neighboring cell list will be prioritized (see Embodiment 2 above).

Prioritize and measure cells with high power level/quality (this criterion may also be used in connection to embodiments 1 and/or 2 in some variants).

Prioritize cells measured with certain event reports (see Embodiment 1 above).

Add signaling such that the network side, e.g. based on load, can prioritize what carrier and/or RAT is prioritized.

Add signaling such that the network can signal the prioritized neighbor cells within a carrier.

Finally, a change of cell decision may be based on measurements that are performed on the basis of the assigned prioritization above.

Some embodiments of the invention use a combination of herein described embodiments 1, 2 and 3.

Figure 4:
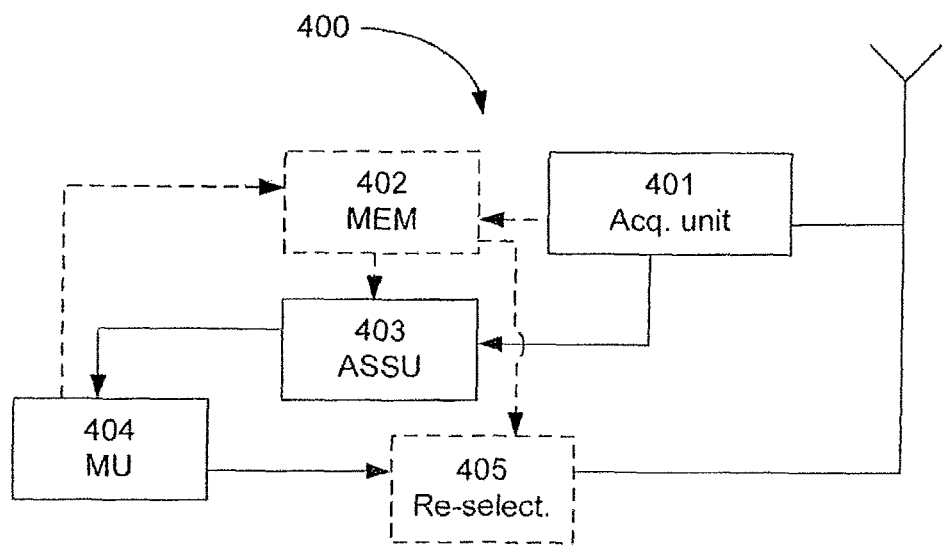
FIG. 4 is a block diagram illustrating an example arrangement according to an embodiment.

FIG. 4 illustrates an example arrangement 400 according to some embodiments of the present invention. The arrangement 400 may, for instance, be configured to perform some or all of the method steps described with respect to the hereinabove-discussed methods.

The arrangement 400 of FIG. 4 is suitable for a user equipment (UE), which is advantageously operable according to one or more RATs.

The arrangement 400 comprises an acquiring unit 401 configured to acquire neighboring cell information relating to a plurality of neighboring cells. The acquiring unit 401 may comprise a radio receiver for receiving the neighboring cell information from the network side (i.e., a node of the network). The arrangement 400 may also comprise a memory (MEM) 402. The memory 402 may, e.g., be configured to store acquired neighboring cell information. Thus, the memory 402 may store a neighboring cell list and, optionally, also other neighboring cell information such as the "cells for measurement"—IE described above.

The arrangement 400 additionally comprises an assignment unit (ASSU) 403. The assignment unit 403 is configured to assign a priority indicator to each neighboring cell on the basis of the acquired neighboring cell information. In some embodiments, the neighboring cell information comprises a neighboring cell list wherein each cell of the neighboring cell list is associated with an index. If so, the assignment unit 403 may be configured to assign the priority indicator on the basis of the indices of the neighboring cells. Additionally, or alternatively, the acquired neighboring cell information may comprise information on measurement reports for a respective cell. If so, the assignment unit 403 may be configured assign the priority indicator on the basis of this information on measurement reports.

The arrangement 400 also comprises a measurement unit (MU) 404 configured to perform measurements on the basis of the assigned priority indicators such that measurements can be performed more frequently for a neighboring cell having a first priority indicator compared with another neighboring cell having a second priority indicator, which second priority indicator is comparatively lower than the first priority indicator. That is to say that the MU 304 is configured to measure those cells with higher priority indicators more frequently than other cells. In an embodiment, the MU may be configured to measure those cells having high priority indicators before cells with comparatively lower priority indicators. Thus, the order of the measurements can be set in dependence of the assigned priority indicators.

The result of the measurements performed may be stored in the memory 402. Furthermore, the result of the measurements may optionally be input to a re-selection unit 405. In idle mode, the re-selection unit 405 is configured to make decisions with respect to changes of cells, i.e. cell re-selection decisions. In contrast, in connected mode, reports can be sent to the network side, which in turn makes any handover decision.

It should be noted that units described as separate units in the context of FIG. 4 may, in some embodiments, be comprised in a single physical or functional unit. Similarly, a unit described as a single physical or functional unit in the context of FIG. 4 may, in some embodiments, be implemented as several separate physical or functional units.

Figure 5:
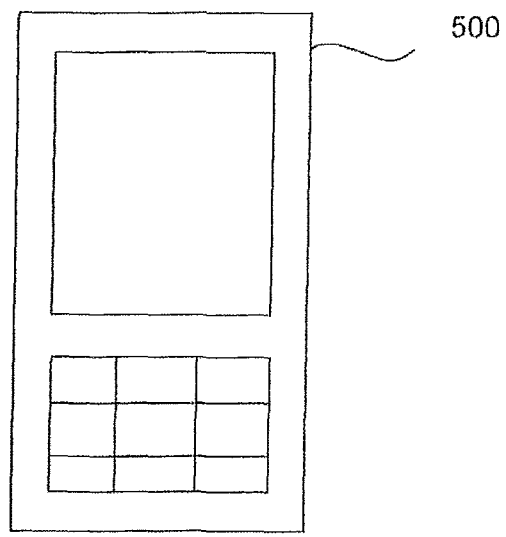
FIG. 5 is a schematic drawing illustrating an electronic device, which may comprise an arrangement shown in FIG. 4.

FIG. 5 illustrates an example electronic device 500 in the form of a user equipment (UE). The UE 500 may comprise an arrangement for controlling neighboring cell measurements according to embodiments of the invention. The UE 500 may, for example, comprise an arrangement as described in connection to FIG. 4. The example UE 500 is adapted to connect to a mobile telecommunication network via a wireless communication link to a radio base station. To this end, the UE 500 may be operable according one or more radio access technologies (RATs) including e.g. GSM (Global System for Mobile Communications), WCDMA (Wideband Code Division Multiple Access), TD-SCDMA (Time Division-Synchronous Code Division Multiple Access), LTE (Long Term Evolution), etc.

Figure 6:
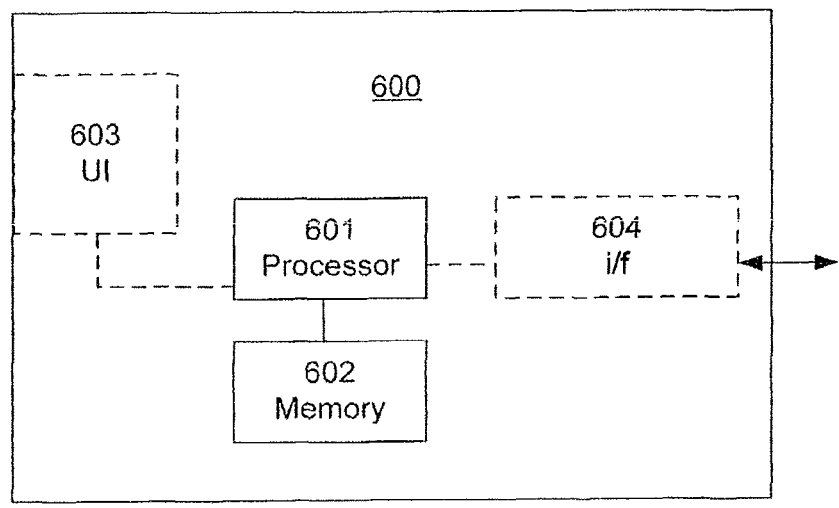
FIG. 6 is a schematic diagram illustrating some modules of an embodiment of a user equipment according to an embodiment.

FIG. 6 illustrates an example electronic device in the form of a UE 600 according to an embodiment. The UE 600 may preferably be operable according to one or more RATs. The UE 600 comprises a processor 601 and a memory 602. The UE 600 may additionally comprise a user interface (UI) 603 including e.g. display, a keypad and/or a touch screen, a loudspeaker, and microphone. The UI 603 thus provides a man-machine interface for operating the UE 600. The UE 600 may also comprise a communication interface (i/f) 604 as is known in the art.

The memory 602 may be configured to store a computer program comprising computer program code which, when run in the processor 601, causes the UE 600 to acquire neighboring cell information relating to a plurality of neighboring cells, assign a priority indicator to each neighboring cell based on the neighboring cell information; and perform measurements on the basis of the assigned priority indicators such that measurements are performed more frequently for a neighboring cell having a first priority indicator compared with another neighboring cell having a second priority indicator, which second priority indicator is comparatively lower than the first priority indicator.

In one embodiment, the memory 602 and the computer program code are configured to, with the processor 601, further cause the UE 600 to perform measurements in an order indicated by the assigned priority indicators.

In yet further embodiments, 602 and the computer program code are configured to, with the processor 601, further cause the UE 600 to execute the steps of the herein described methods, see e.g. Embodiments 1-3 described previously.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the present invention.

Figure 7:
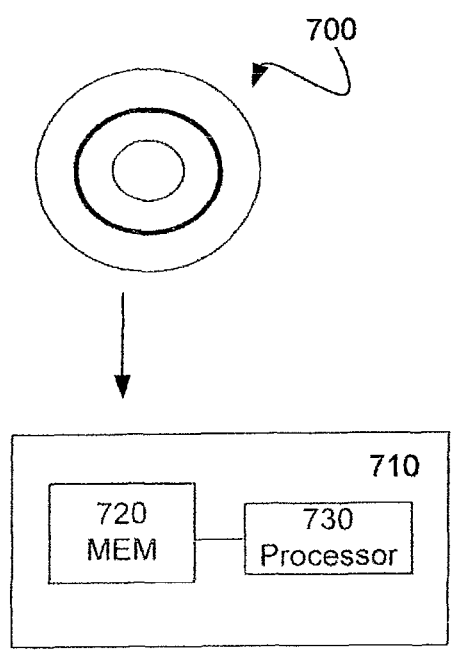
FIG. 7 is a schematic drawing illustrating a computer program product according to an embodiment of the invention.

According to some embodiments of the invention, a computer program product comprises a computer readable medium such as, for example, a diskette or a CD-ROM. FIG. 7 shows an example of such a computer program product in the form of a CD-ROM 700. The computer readable medium may have stored thereon a computer program comprising program instructions. The computer program may be loadable into a data-processing unit 730, which may, for example, be comprised in an electronic device 710. When loaded into the data-processing unit 730, the computer program may be stored in a memory 720 associated with or integral to the data-processing unit 730. According to some embodiments, the computer program may, when loaded into and run by the data-processing unit 730, cause the data-processing unit to execute method steps according to, for example, the methods described hereinabove.

An advantage with various embodiments of the invention is that cells that have high priority indicators (i.e., cells that are prioritized more) will be measured more frequently. Thus, it is believed that suitable cells will be found (i.e., detected) more quickly, hence, reducing the risk of dropping a call during the handover (or, cell re-selection). Moreover, for cells having high priority indicators (i.e., cells that are prioritized over other cells) the measurements can be made up to date since the measurements are made more frequently.

In some circumstances the UE must be able to react very fast to changes. Due to limited hardware resources etc. as well as power consumption it is sometimes a trade-off between the reaction time and the resources of the UE. Therefore it is an advantage to use available information to focus the available resources on the cells which can be considered more important, or can be considered being better candidate cells. The various embodiments of this invention provides a way of predicting the cells that are of most importance with respect to maintaining the call. A UE which follows the herein disclosed embodiments or approaches would experience fewer call drops. Also, if the network side supports the herein disclosed approaches (e.g., assigning or setting closest neighbor cells in lower indices) would help the UE prioritize cells, thereby reducing the number of call drops.

Although the present invention has been described above with reference to specific embodiments, it is not intended to be limited to the specific form set forth herein. Rather, the invention is limited only by the accompanying claims and other embodiments than the specific above are equally possible within the scope of the appended claims. Furthermore, while some embodiments refer to "high" and "low" respectively, it should be understood that these expressions are relative. For example, although the appended claims (and description) refer to assigning "high" priority indicators, it should be appreciated that essentially the same effects could be reached in essentially the same way by assigning "low" priority indicators. Thus, any modifications of the herein described embodiments to assign "low priority indicators" (cf "high priority indicators") for achieving essentially the same effect in essentially the same way should be regarded as falling within the scope of the claimed invention as defined in the appended claims.

Moreover, although the present disclosure made reference to various 3GPP technical specifications, this does not mean that various embodiments are not suitable or applicable in other standards too. Rather, the various embodiments of the invention could be envisaged to be applied in other technical standards other than 3GPP standards. Also, embodiments of the present invention are applicable to past and future technical specifications of the 3GPP other than those explicitly mentioned herein.

As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a user equipment, UE, the method comprising:
   acquiring neighboring cell information relating to a plurality of neighboring cells;
   assigning a priority indicator to each neighboring cell based on the neighboring cell information; and
   performing measurements on the basis of the assigned priority indicators such that measurements are performed more frequently for a neighboring cell having a first priority indicator compared with another neighboring cell having a second priority indicator, which second priority indicator is comparatively lower than the first priority indicator,
   wherein the neighboring cell information comprises a neighboring cell list and information on measurement reports for a respective cell in the neighboring cell list, wherein each cell of the neighboring cell list is associated with an index, wherein the step of assigning the priority indicator comprises initially assigning the priority indicator on the basis of the information on the measurements reports and then adjusting the assigned priority indicator on the basis of the indices of the neighboring cells, and wherein the step of assigning the priority indicator comprises assigning a comparatively higher priority indicator to a neighboring cell that is configured for measurement reports that are relevant for handover compared with another neighboring cell that is configured for other measurement reports.

2. The method according to claim 1, wherein the measurement reports that are relevant for handover comprises event reports 1A, 1B and/or 1C, wherein event report 1A is when a Primary Common Pilot Indicator Channel (CPICH) enters a reporting range, event report 1B is when a primary CPICH leaves the reporting range, and event report 1C is when a non-active Primary CPICH becomes better than an active Primary CPICH.

3. The method according to claim 1, wherein the step of performing measurements on the basis of the assigned priority indicators comprises performing the measurements in an order indicated by the assigned priority indicators.

4. The method according to claim 1, wherein the step of assigning the priority indicator comprises assigning a comparatively higher priority indicator to a neighboring cell having a first index compared with another neighboring cell having a second index, which second index is comparatively higher than the first index.

5. A method performed by a user equipment, UE, the method comprising:
   acquiring neighboring cell information relating to a plurality of neighboring cells;
   assigning a priority indicator to each neighboring cell based on the neighboring cell information; and performing measurements on the basis of the assigned priority indicators such that measurements are performed more frequently for a neighboring cell having a first priority indicator compared with another neighboring cell having a second priority indicator, which second priority indicator is comparatively lower than the first priority indicator, wherein the neighboring cell information comprises information on measurement reports for a respective cell in a neighboring cell list, wherein the step of assigning the priority indicator comprises assigning the priority indicator on the basis of the information on the measurements reports, and wherein the step of assigning the priority indicator comprises assigning a comparatively higher priority indicator to a neighboring cell that is configured for measurement reports that are relevant for handover compared with another neighboring cell that is configured for other measurement reports, wherein the neighboring cell information comprises the neighboring cell list and wherein the step of assigning the priority indicator comprises assigning a priority indicator based on a relative number of occurrences of a carrier frequency in the neighbor cell list so that a comparatively higher priority indicator is assigned to a neighboring cell having a first carrier frequency compared with another neighboring cell having a second carrier frequency, wherein a number of cells having the first carrier frequency comprised in the neighboring cell list is higher than a number of cells having the second carrier frequency comprised in the neighboring cell list.

6. A non-transitory computer program product comprising a computer readable medium, having thereon a computer program comprising program instructions, the computer program being loadable into a data-processing unit for a user equipment, and the computer program, when the computer program is run by the data-processing unit, being adapted to cause execution of the method of:

acquiring neighboring cell information relating to a plurality of neighboring cells;

assigning a priority indicator to each neighboring cell based on the neighboring cell information; and performing measurements on the basis of the assigned priority indicators such that measurements are performed more frequently for a neighboring cell having a first priority indicator compared with another neighboring cell having a second priority indicator, which second priority indicator is comparatively lower than the first priority indicator, wherein the neighboring cell information comprises a neighbor cell list and information on measurement reports for a respective cell in the neighboring cell list, wherein each cell of the neighboring cell list is associated with an index, wherein the step of assigning the priority indicator comprises initially assigning the priority indicator on the basis of the information on the measurements reports and then adjusting the assigned priority indicator on the basis of the indices of the neighboring cells, and wherein the step of assigning the priority indicator comprises assigning a comparatively higher priority indicator to a neighboring cell that is configured for measurement reports that are relevant for handover compared with another neighboring cell that is configured for other measurement reports.

7. An arrangement for a user equipment, UE, the arrangement comprising:

an acquiring unit configured to acquire neighboring cell information relating to a plurality of neighboring cells;

an assignment unit configured to assign a priority indicator to each neighboring cell based on the neighboring cell information;

a measurement unit configured to perform measurements on the basis of the assigned priority indicators such that measurements can be performed more frequently for a neighboring cell having a first priority indicator compared with another neighboring cell having a second priority indicator, which second priority indicator is comparatively lower than the first priority indicator, wherein the neighboring cell information comprises a neighboring cell list and information on measurement reports for a respective cell in the neighboring cell list, wherein each cell of the neighboring cell list is associated with an index, wherein the assignment unit is configured to initially assign the priority indicator on the basis of the information on the measurements reports then adjusting the assigned priority indicator on the basis of the indices of the neighboring cells, and wherein the assignment unit is further configured to assign a comparatively higher priority indicator to a neighboring cell that is configured for measurement reports that are relevant for handover compared with another neighboring cell that is configured for other measurement reports.

8. The arrangement according to claim 7, wherein the measurement reports that are relevant for handover comprises event reports 1A, 1B and/or 1C, wherein event report 1A is when a Primary Common Pilot Indicator Channel (CPICH) enters a reporting range, event report 1B is when a primary CPICH leaves the reporting range, and event report 1C is when a non-active Primary CPICH becomes better than an active Primary CPICH.

9. The arrangement according to claim 7, wherein measurement unit is configured to perform measurements in an order indicated by the assigned priority indicators.

10. The arrangement according to claim 7, wherein the assignment unit is configured to assign a comparatively higher priority indicator to a neighboring cell having a first index compared with another neighboring cell having a second index, which second index is comparatively higher than the first index.

11. The arrangement according to claim 7, wherein the arrangement is comprised in an electronic device.

\* \* \* \* \*